United States Patent
Okudaira

(10) Patent No.: US 7,207,022 B2
(45) Date of Patent: Apr. 17, 2007

(54) LAYOUT DESIGN METHOD FOR SEMICONDUCTOR INTEGRATED CIRCUITS

(75) Inventor: Takatoshi Okudaira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/255,965

(22) Filed: Oct. 24, 2005

(65) Prior Publication Data

US 2006/0112360 A1    May 25, 2006

(30) Foreign Application Priority Data

Nov. 19, 2004   (JP)   ............................. 2004-336370

(51) Int. Cl.
  *G06F 17/50*   (2006.01)
(52) U.S. Cl. .................... 716/6; 716/2; 716/11; 716/12
(58) Field of Classification Search .................... 716/2, 716/6, 8, 10, 11, 12, 18
See application file for complete search history.

(56) References Cited

U.S. PATENT DOCUMENTS

2004/0168143 A1*   8/2004   Kishibe ....................... 716/10

FOREIGN PATENT DOCUMENTS

| JP | 09-246389 | 9/1997 |
| JP | 09-282341 | 10/1997 |

* cited by examiner

*Primary Examiner*—Thuan Do
(74) *Attorney, Agent, or Firm*—Rabin & Berdo, P.C.

(57) ABSTRACT

A method of designing a semiconductor integrated circuit creates a net list with cells from a low-threshold-voltage cell library, then arbitrarily replaces some or all of the cells with cells from a high-threshold-voltage cell library. A timing analysis is performed, and if necessary, the net list is further modified by using cells from the low-threshold-voltage cell library to eliminate or reduce timing errors. Place and route processes are then carried out to create layout data, and another timing analysis is performed. If timing errors are found, the paths on which the timing errors occur are optimized by resizing or replacing cells or inserting buffers until the timing errors are eliminated. This method maximizes usage of cells from the high-threshold-voltage cell library and therefore produces a design with reduced leakage current.

8 Claims, 2 Drawing Sheets

LAYOUT DESIGN METHOD FOR SEMICONDUCTOR INTEGRATED CIRCUITS

BACKGROUND OF THE INVENTION

1. Field of the Invention

The present invention relates to a layout design method for semiconductor integrated circuits, more particularly to a layout design method that reduces power consumption.

2. Description of the Related Art

In addition to high integration and high processing speed, lower power consumption is an important requirement for semiconductor integrated circuits. Power consumption is generally categorized into two types: dynamic or active power consumption, caused by operation; and standby power consumption, caused by current leakage.

With the continually shrinking feature sizes in recent fabrication processes, the gate lengths of the metal oxide semiconductor field-effect transistors (MOSFETs) in semiconductor integrated circuits have been reduced to the point where current leakage cannot be ignored. A known countermeasure to current leakage is to design a semiconductor integrated circuit as a combination of cells taken from two types of cell libraries. One type (referred to as a high threshold voltage or Hvt cell library below) uses MOSFETs having a relatively high threshold voltage, a relatively small leakage current, and a relatively low operating speed; the other type (referred to as a low threshold voltage or Lvt cell library below) uses MOSFETs having a relatively low threshold voltage, a relatively large leakage current and a relatively high operating speed. In a typical example, Lvt cells operate twice as fast as Hvt cells but have twenty times as much leakage current. Using $T_{Delay}$ to denote propagation delay and $I_{Leak}$ to denote leakage current, this can be expressed as follows:

$$T_{DelayLvt}:T_{DelayHvt}=1:2$$

$$I_{LeakLvt}:I_{LeakHvt}=1:0.05$$

In the logic synthesis stage before the layout process, Lvt cell libraries are generally used in order to satisfy constraints related to operating speed, because if Hvt cell libraries were to be used to reduce leakage current, operating speed would be inadequate. A conventional layout design method for semiconductor integrated circuits, more particularly, a method that reduces their leakage current, then proceeds as follows.

Referring to FIG. 1, this method utilizes a pre-layout net list 103 comprising data taken from Lvt cell libraries, layout data 104 comprising data obtained immediately after the layout process; and layout data 105 comprising layout data taken from both Lvt and Hvt cell libraries.

In this method, first a placement layout process 30 uses the pre-layout net list 103 to position cells. A routing layout process 40 then routes wiring paths among the cells and accordingly generates the layout data 104. Next, a delay time analysis process 50 is carried out. If, as a result, the propagation delay time of a signal does not satisfy operational constraints, a timing correction process 51 carries out resizing or other appropriate processing on the cells and the layout process returns to the placement layout process 30.

When the propagation delay times of all signals satisfy the operational constraints in the delay time analysis process 50, the design process proceeds to a non-critical path replacement process 60, in which Lvt cells on non-critical paths are replaced by Hvt cells with the same logic and size to generate the second layout data 105. Then a hold timing analysis 70 is carried out. If a hold error occurs, another timing correction process 71 inserts delay adjustment cells and the design process returns to the placement layout process 30. When all operational constraints are satisfied, the layout design ends.

The non-critical paths in the above method are paths with ample timing margins. Because Lvt cells are replaced with Hvt cells only on these paths, the proportion of Hvt cells remains comparatively low and current leakage remains comparatively high, sometimes too high to meet system power consumption specifications.

SUMMARY OF THE INVENTION

An object of the present invention is to provide a layout design method for semiconductor integrated circuits that can achieve further reductions in power consumption.

The layout design method provided by the present invention includes the following steps:

generating a first pre-layout net list from a first cell library having MOSFETs with a comparatively low threshold voltage;

replacing at least some of the logic blocks in the pre-layout net list with data from a second cell library having MOSFETs with a comparatively high threshold voltage to generate a second pre-layout net list;

analyzing propagation delay times on the basis of the second pre-layout net list and detecting timing errors;

iteratively modifying the second pre-layout net list, preferentially using cells from the first cell library on paths on which timing errors were detected, until the timing errors are eliminated or at least adequately reduced;

creating a cell layout by placing the cells included in the modified second pre-layout net list in appropriate positions;

routing wiring among the cells in the cell layout, thereby generating layout data;

analyzing propagation delay times on the basis of the layout data and detecting further timing errors; and optimizing paths on which further timing errors are detected by, for example, resizing cells, inserting buffers, and replacing cells.

The invented method enables high threshold voltage cells to be used more extensively than is possible in conventional methods that restrict their use to non-critical paths. Current leakage and therefore power consumption are reduced accordingly.

DETAILED DESCRIPTION OF THE INVENTION

Figure 1:
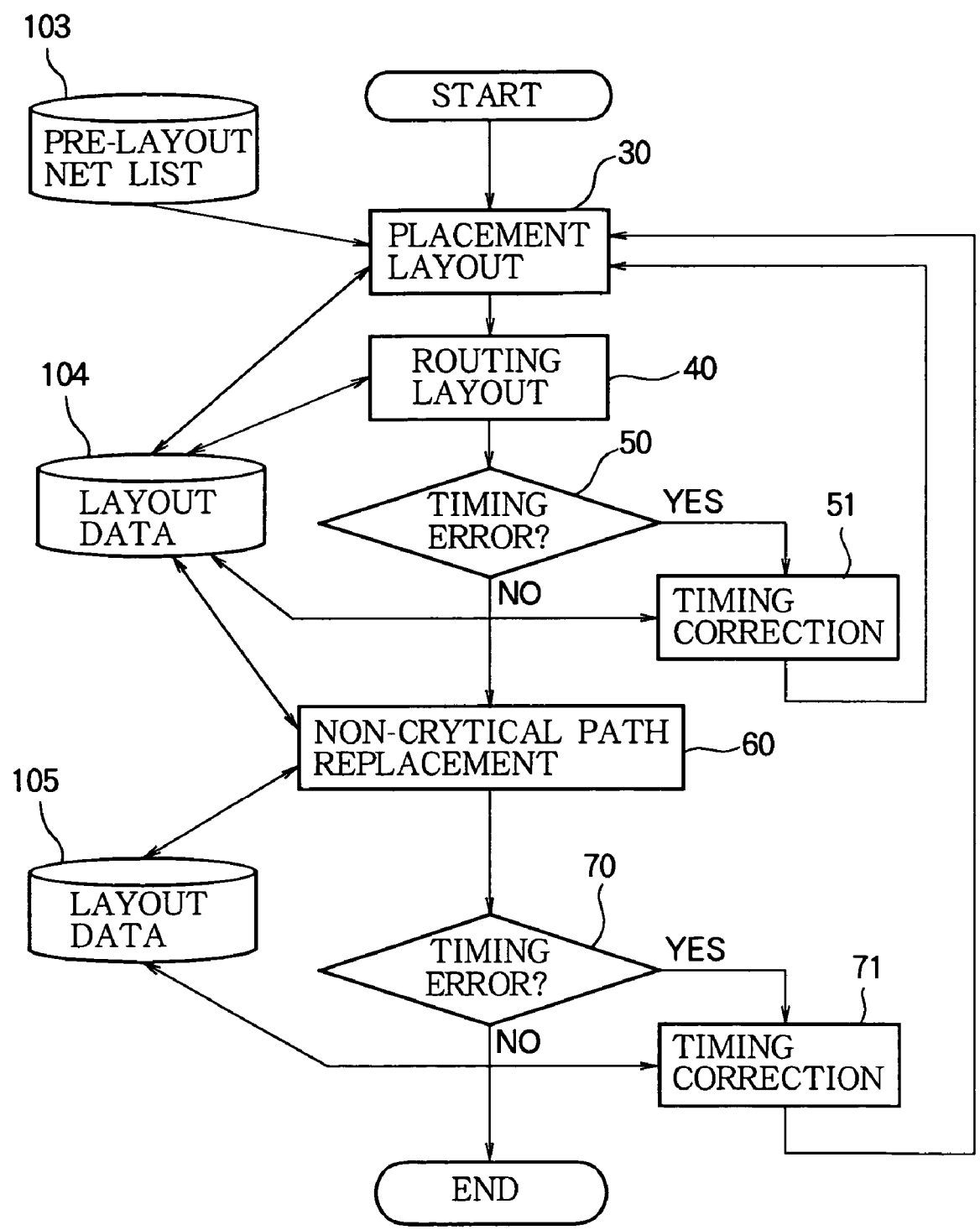
FIG. 1 is a flowchart showing a conventional layout design method for semiconductor integrated circuits.

An embodiment of the invention will now be described with reference to FIG. 2. This embodiment is a layout design method including an Hvt cell library replacement process 100, a delay time analysis process 200, a timing correction process 210, a placement layout process 300, a routing layout process 400, a delay time analysis process 500, and a timing optimization process 510. These processes make use of a pre-layout net list 1001 and modified net lists 1002, 1003 to generate layout data 1004.

First, in the Hvt cell library replacement process 100, cell data in the pre-layout net list 1001 are input and logic blocks consisting of Lvt cell library data are partially or entirely replaced with Hvt cell library data to generate the first modified net list 1002. The Lvt and Hvt cells need not have identical circuitry, but they should at least perform the same logic functions.

Next, using the modified net list 1002, the first delay time analysis process 200 analyzes propagation delay times. Delay times on all existing signal paths are calculated according to their assumed pre-layout wiring lengths, and whether or not each calculated delay time satisfies a predetermined setup time requirement is determined.

If a delay time does not satisfy the necessary setup time requirement, it causes a setup error. The timing correction process 210 then makes further changes to the net list, giving priority to the use of Lvt cells on the paths on which the setup errors occurred, and resubmits the modified net list to the delay time analysis process 200. The loop comprising the delay time analysis process 200 and the timing correction process 210 is iterated until no setup errors are found, at which point the net list is stored as the second modified net list 1003.

Next, the placement layout process 300 places the cells in appropriate positions to create a floor plan of the integrated circuit die, and the routing layout process 400 routes signal lines among the cells, thereby generating the layout data 1004.

Next, the second delay time analysis process 500 carries out a delay time analysis on the layout data 1004 and decides whether or not the propagation delay times satisfy all necessary operational constraints, and reports a timing error if a constraint is not satisfied, a timing error occurs. The timing optimization process 510 then modifies the net-list data on the paths on which timing errors occurred by, for example, resizing cells, inserting buffers, or replacing cells, and returns to the placement layout process 300. The placement layout process 300 and routing layout process 400 make corresponding changes to the layout data 1004, after which the delay time analysis process 500 is repeated. The loop comprising the placement layout process 300, the routing layout process 400, the second timing analysis process 500, and the timing optimization process 510 is iterated until all timing constraints are satisfied and no timing error occurs, at which time the layout processing ends.

Because it precedes the delay time analysis processes 200, 500 and the placing and routing layout processes 300, 400, the Hvt cell library replacement process 100 is not limited by known critical paths and is free to replace Lvt cells with Hvt cells arbitrarily. Various replacement criteria can be used, but if the criteria are satisfied, all Lvt cells can be replaced with Hvt cells. If the modified net list and layout data then pass the checks made in the delay time analysis processes 210, 510, the Hvt cell content of the final design can be as high as 100%.

Figure 2:
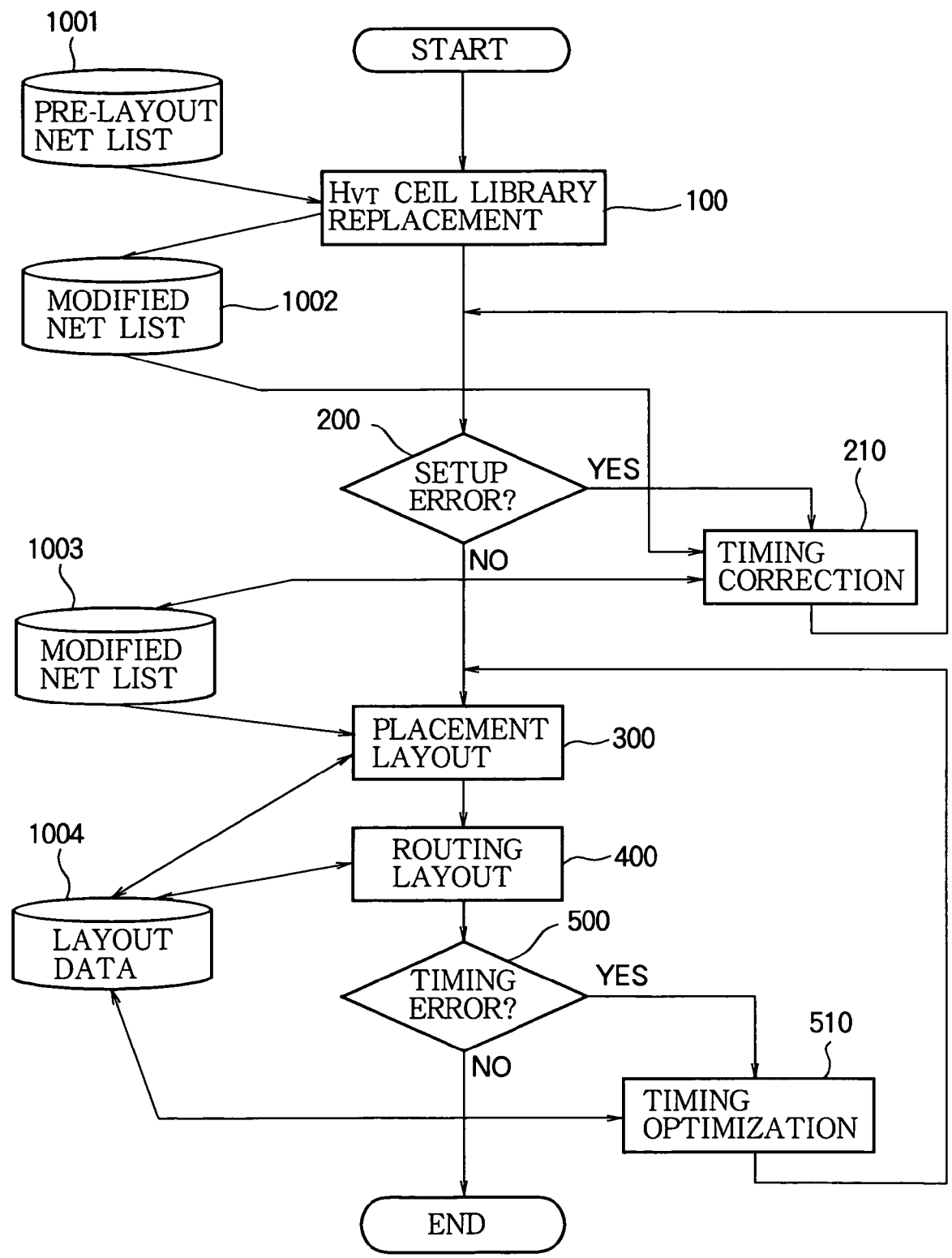
FIG. 2 is a flowchart showing a layout design method for semiconductor integrated circuits according to an embodiment of the invention.

To test the effect of the present invention, the inventor applied the novel layout design method illustrated in FIG. 2 to integrated circuits for which the conventional method illustrated in FIG. 1 provided a 37% to 40% Hvt cell content. The leakage current in these integrated circuits ranged from 146.75 microamperes to 150.42 microamperes. When the circuits were redesigned by the novel method, the Hvt cell content was more than doubled, ranging from 87.4% to 96.9%, and the leakage current was reduced by an even greater factor, ranging from 58.7 microamperes down to 15.53 microamperes.

In the embodiment described above the first delay time analysis process 200 and the timing correction process 210 are iterated until no timing errors are found. In a modification of this embodiment, a predetermined threshold value is used, and the delay timing analysis process 200 and timing correction process 210 are iterated until the number of timing errors is less than the threshold value. Alternatively, the first delay time analysis process 200 and the timing correction process 210 may be iterated until the values of all timing errors are less than a predetermined threshold value.

The invention is applicable to any Lvt and Hvt cell libraries. It is not necessary for the delay ratio of the Lvt and Hvt cell libraries to be 1:2 and the leakage current ratio to be 1:0.05, for example. The performance ratios of the Lvt and Hvt cell libraries will in general vary with the fabrication process, and different libraries may also be selected for use in designing different types of products.

Those skilled in the art will recognize that further variations are possible within the scope of the invention, which is defined in the appended claims.

What is claimed is:

1. A layout design method for semiconductor integrated circuits, comprising:
   generating a first pre-layout net list consisting of data from a first cell library including logic blocks having metal oxide semiconductor field-effect transistors (MOSFETs) with a first threshold voltage;
   replacing at least some of the logic blocks in the pre-layout net list with data from a second cell library including logic blocks having MOSFETs with a second threshold voltage, the second threshold voltage being higher than the first threshold voltage, thereby generating a second pre-layout net list;
   analyzing propagation delay times in the second pre-layout net list and detecting first timing errors;
   iteratively modifying the second pre-layout net list, giving priority to at least some paths on which the first timing errors were detected for use of cells in the first cell library, until the first timing errors are reduced below a predetermined threshold value;
   placing the cells included in the modified second pre-layout net list in appropriate positions to create a cell layout;
   routing wiring among the cells in the cell layout, thereby generating layout data;
   analyzing propagation delay times in the layout data and detecting second timing errors; and
   optimizing the layout data on paths on which the second timing errors were detected.

2. The method of claim 1, wherein optimizing the layout data further comprises resizing cells.

3. The method of claim 1, wherein optimizing the layout data further comprises inserting buffers.

4. The method of claim 1, wherein optimizing the layout data further comprises replacing cells from the second cell library with cells from the first cell library.

5. The method of claim 1, wherein optimizing the layout data further comprises repeating the placing of the cells, the routing of the wiring, and the analyzing of propagation delay times in the layout data until no second timing errors are detected.

6. The method of claim 1, wherein the first timing errors are setup errors.

7. The method of claim 1, wherein iteratively modifying the second pre-layout net list includes:
   modifying the second pre-layout net list; and
   analyzing propagation delay times in the modified second pre-layout net list to detect further first timing errors.

8. The method of claim 1, wherein the second pre-layout net list is iteratively modified until no first timing errors are detectable.

* * * * *